Patented Aug. 22, 1972

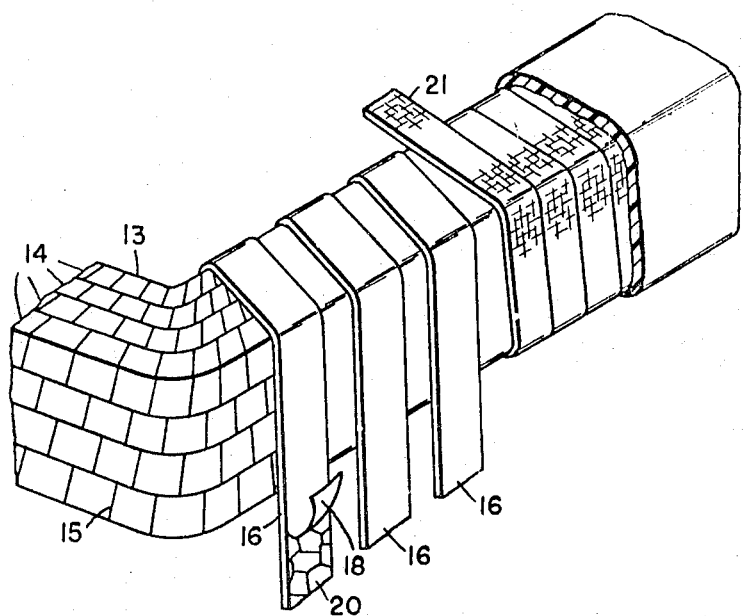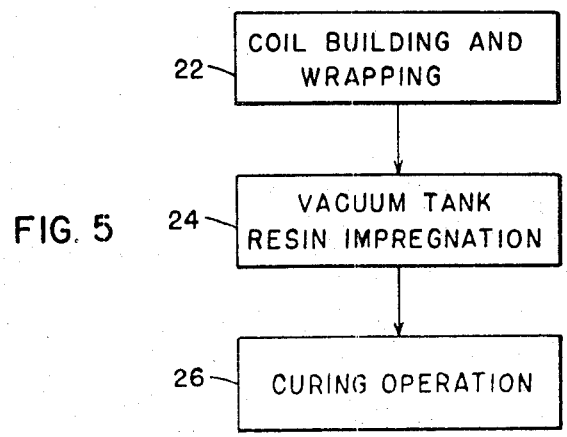

3,686,045

BONDING INSULATION MATERIAL WITH HALF ESTER OF AN EPOXY RESIN AND UNSATURATED DICARBOXYLIC ACID ANHYDRIDE COMPOSITION

Newton C. Foster, Pittsburgh, Pa., assignor to Westinghouse Electric Corporation, Pittsburgh, Pa.
Original application Oct. 27, 1967, Ser. No. 678,703, now Patent No. 3,557,246, dated Jan. 19, 1971. Divided and this application Aug. 28, 1970, Ser. No. 67,928
Int. Cl. H01b 13/06
U.S. Cl. 156—53          7 Claims

ABSTRACT OF THE DISCLOSURE

Compositions of months-long catalyzed pot life at room temperature and hence especially suitable for coating large objects such as high voltage coils, are made by mixing (a) the product of the uncatalyzed half-esterification of epoxy resin with an olefinically unsaturated dicarboxylic acid anhydride (e.g., maleic anhydried), (b) a coreactive vinyl monomer (e.g., styrene), (c) a polycarboxylic anhydride containing no olefinic unsaturation (e.g., NADIC methyl anhydride [NMA] viscous liquid methyl bicyclo [2.2.1] heptene-2,3-dicarboxylic anhydride isomers) and (d) polymerization catalysts and inhibitors. The large objects are impregnated with liquid low viscosity compositions. Upon heating, the composition cures to a thermoset resin.

CROSS-REFERENCE TO RELATED APPLICATIONS

This application is a division of application Ser. No. 678,703 filed Oct. 27, 1967 issued as U.S. Pat. 3,557,246.

BACKGROUND OF THE INVENTION

(1) Field of the invention

This invention relates to novel epoxy-resin compositions having excellent catalyzed pot life in combination with other desirable properties, the process for making such compositions, methods of using such compositions to produce such articles as castings, potted or encapsulated or impregnated electrical or electronic components, and bonded laminate materials based upon resin impregnated paper, cloth, woven glass, or the like. It further relates to novel articles of manufacture of the aforementioned kind, made with the use of the novel epoxy-resin compositions of the invention.

(2) Description of the prior art

U.S. Pat. No. 3,099,638, for example, teaches making an epoxy-resin composition from a mixture containing maleic anhydride, epoxy resin, styrene, and a vinyl-polymerization catalyst. It does not, however provide a composition with catalyzed room-temperature pot life any longer than, at most, several days. Those compositions differ from the compositions of the present invention in that they are not pre-reacted and contain an esterification catalyst, such as a tertiary amine, to promote or accelerate the reaction between the epoxy resin and the maleic anhydride. The compositions of U.S. Pat. No. 3,099,638 are made by mixing together all the ingredients (maleic and other anhydrides, epoxy resin, tertiary amine, styrene, vinyl-polymerization catalyst) and then heating to cure the mixture. For such a one-stage mixing procedure to be successful, the composition must contain a tertiary amine or other esterification catalyst. If the reaction of maleic anhydride and epoxy resin is not catalyzed, the maleic anhydride will react with styrene to form a styrene-maleic polymer, and this will yield a cloudy and brittle cured composition of little or no usefulness.

BRIEF SUMMARY OF THE INVENTION

It has now been found that by conducting the esterification reaction separately without the styrene and without a catalyst, then later adding the other ingredients such as styrene and the vinyl-polymerization catalyst, compositions of truly excellent catalyzed pot life and short gel time are obtained. The new epoxy-resin-base compositions are suitable for a new range of applications that were previously served only by the polyester-based resin compositions of long pot life making available for the first time in those applications the superior properties such as adhesiveness, chemical inertness, and especially the good electrical resistivity that characterize the epoxy resins. The profound improvement in catalyzed pot life makes the resin compositions of this invention especially valuable for encapsulating large parts such as generator stator coils twenty feet long by immersing them in several thousand gallons of the composition; this operation is impractical unless the large volume of the encapsulant composition has a pot life that permits it to be used repeatedly over a long period of at least several weeks.

The method comprises reacting in the absence of an esterification catalyst an epoxy resin and an appropriate amount of an olefinically unsaturated anhydride such as maleic anhydride under such conditions that the reaction proceeds substantially only to the half-ester stage, then adding to said half-esterified product (1) styrene or suitable other vinyl monomer, (2) an addition-polymerization catalyst such as benzoyl peroxide, and (3) an anhydride containing no olefinic unsaturation and therefore not reactive with styrene, and if desired, (4) an inhibitor of addition polymerization such as a small amount of hydroquinone.

It is an object of this invention to provide a novel-epoxy-resin composition having long catalyzed pot life and good electrical properties at high temperatures.

Another object is to provide a method by which such compositions are made.

Another object of the invention is to provide an improved insulating material for high-voltage applications.

Yet another object is to provide articles having a desirable combination of properties, including good high-temperature electrical insulating properties and improved chemical inertness.

BRIEF DESCRIPTION OF THE DRAWINGS

A complete understanding of the invention may be obtained from the foregoing and following description thereof, taken together with the appended drawings, in which:

FIG. 2 shows an encapsulated electrical article made in accordance with the instant invention;

FIG. 3 shows a resinous laminate made in accordance with the instant invention;

FIG. 4 shows a wrapped resin-impregnated coil made in accordance with the instant invention; and FIG. 5 is a flow sheet of the process for making the coil shown in FIG. 4.

DESCRIPTION OF THE PREFERRED EMBODIMENT

Figure 1:
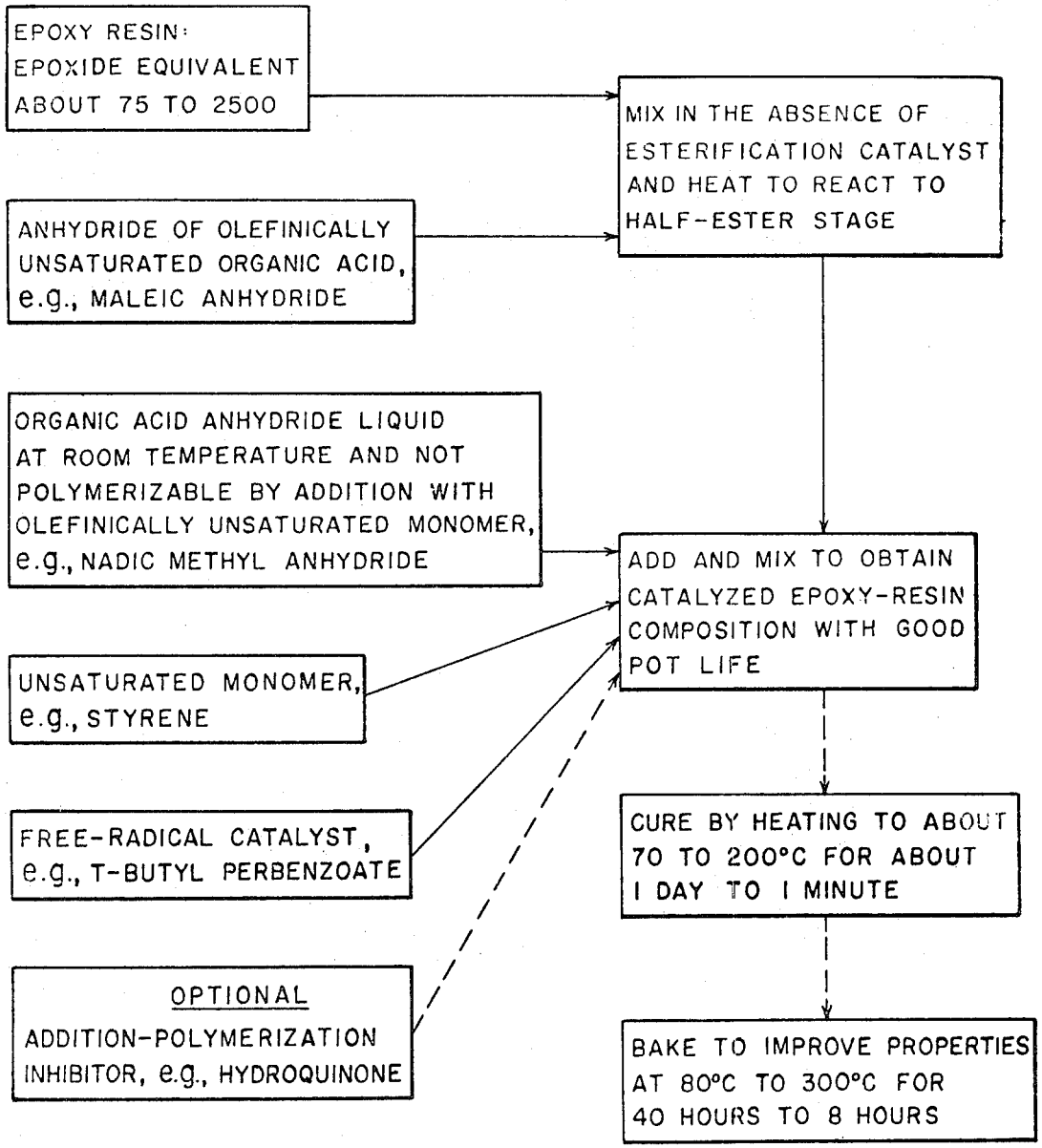
FIG. 1 is a flow sheet of the process for making the epoxy-resin compositions in accordance with the instant invention.

An understanding of the invention will be aided by the following description which is to be interpreted as illustrative and not in a limiting sense.

The first reaction is between an epoxy resin and an organic acid anhydride, such as maleic anhydride, that has olefinic unsaturation and is, accordingly, capable of reacting later with an addition-polymerizable monomer such as monostyrene. This first reaction is controlled to substantially form only a half-ester. For example, the esterification of an epoxy resin (the known bisphenol-epichlorohydrin type) with maleic anhydride occurs primarily between the hydroxyl groups of the resin and the maleic anhydride, to produce:

conditions suitable for the formation of the half-ester may be selected.

Epoxidized novolac resins, which may be employed in this invention, do not contain hydroxyl groups. However, they react with maleic anhydride, if not directly then with

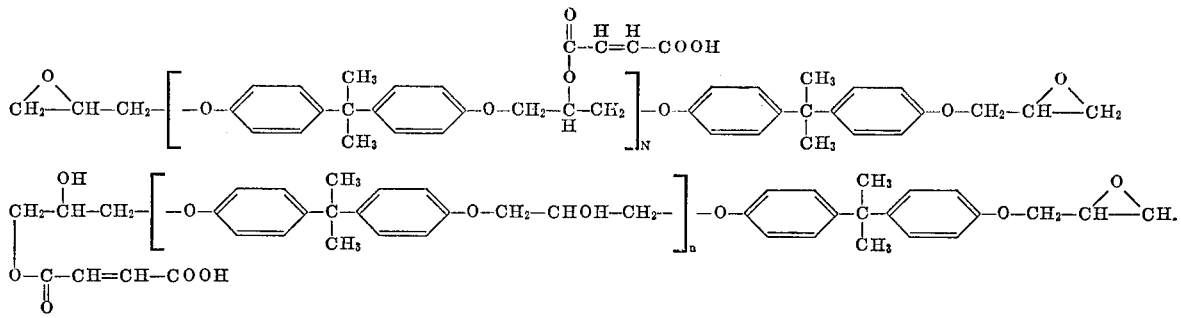

A small amount of the maleic anhydride may instead react with the epoxy groups to form the following:

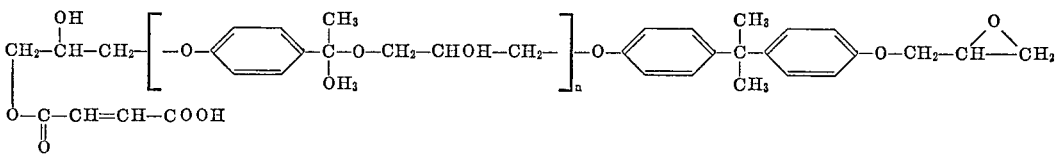

It should be understood that the esterification reaction occurring with the hydroxyl group is the predominant reaction. The value of $n$ in the foregoing formulae is an integer of the series 0, 1, 2, 3, 4, etc. for any single molecule. Since the epoxy composition will be a mixture of different molecules, the actual average value for $n$ will ordinarily not be an integer. The average value of $n$ will, of course, reflect the average molecular weight of the epoxy composition. Both of the foregoing products and mixtures thereof are considered to be suitable half-esters for this invention.

As shown above, the maleic anhydride has reacted to the half-ester stage, i.e., to form an acid-ester. The carboxyl group of the half-ester product is capable of reacting with an epoxy group in the same resin molecule or, more likely, another resin molecule. If this occurs, cross-linked molecules of high molecular weight are produced and the resin sets up and becomes incompatible with, or incapable of reacting with, styrene or the like which, in accordance with this invention, is subsequently incorporated in the resin composition. Thus, the reaction between epoxy resin and maleic anhydride must not be taken beyond the described half-ester stage.

The description of the reaction conditions for the production of the half-ester is necessarily somewhat inexact. It is possible for a properly reacted mixture to contain not only the desired half-ester but also small amounts of both the unreacted anhydride and the full ester. Six hours at 90° C. gives an optimal reaction between the epoxy resin mixture (bisphenol type plus novolac type) and maleic anhydride, whereas reaction for 2 to 4 hours at about 135° C. to 150° C. causes sufficient full ester formation to cause gellation. By infrared analysis, these and similar reaction conditions can be followed to obtain an indication of the extent and progress of the reaction so that the maleic acid formed by the reaction of the anhydride with small quantities of water incidentally present, as follows:

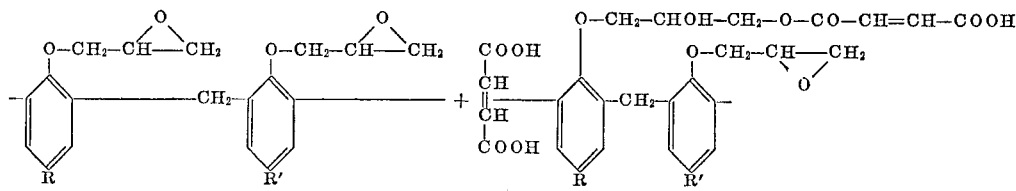

R and R' are almost always the radical —H but may be lower alkyls of up to four carbon atoms.

In accordance with the invention, only a rather small but critical amount of the maleic or similar olefinically unsaturated dicarboxylic anhydride is used, not nearly enough to react with all the hydroxyl or epoxy groups of the epoxy resin. If too much maleic anhydride is used the pot life is too short. If too little is used the curing time is undesirably long. While 1 to 10 parts of this anhydride per 100 parts of epoxy resin may be employed, the preferred range is 2.5 to 5 parts by weight. This is illustrated by Examples XI to XV, hereinbelow.

It should be understood that the half-esters of this invention are molecules with the special properties of (1) having several unreacted hydroxyl and/or epoxy groups that are themselves capable of reacting with difunctional or polyfunctional organic anhydrides to cause cross-linking and yield a thermostat resin, (2) having in the ester side chain a reactive double bond that may be opened to participate in addition polymerization with, e.g., styrene, (3) having on the ester side chain a carboxyl group that may react with epoxy or hydroxyl groups and (4) having epoxy groups that are themselves capable of reaction with other epoxy groups to give cross-linking.

The half-esters of this invention are then mixed or blended with (1) monostyrene or other addition-polymerizable monomer and (2) an anhydride containing no olefinic unsaturation and thus not reactive with the monomer (1) but being reactive with the hydroxyl and/or epoxy groups of the partially esterified epoxy molecule. These polyfunctional anhydrides (2) are preferably liquid at room temperature, but not necessarily so. There is also added a suitable catalyst for addition polymerization, and there is thus obtained a mixture having the chief advantage of remaining unreacted and fluid for several days to several months if not exposed to temperatures high enough to effect the reactions that are involved in the final cure. Yet when subjected to such temperatures, the resin cures relatively rapidly.

It must be emphasized that the initial esterification reaction is uncatalyzed. If a tertiary amine or other catalyst is added to promote half-ester formation, it is impractical to remove such esterification catalyst, which then remains in the system and goes on working at room temperature to promote full-ester formation and thereby shorten the pot life to something like a day or two. For many of the purposes of the epoxy-resin compositions of the invention, this is intolerable. One intended use of certain compositions of the invention is the impregnation and coating of large generator stator coils, which may be twenty feet long. The usual practice is to place a number of these into a large chamber, which is then evacuated. A large batch of uncured resin composition is then introduced to flood the surfaces of the large coils which are then removed from the resin-composition bath and baked to cure the resin. The remaining resin-composition bath is saved and reused. It is not practical to proceed in this way without making and using a large batch of uncured resin composition, such as several thousand gallons. The uncured resin composition must retain its low viscosity for a long time, preferably six months or more. Long-pot-life impregnating compositions are known, but they are of the polyester type.

The reactions that occur when the above-indicated mixture or resin blend is heated to a curing temperature will now be described. For purposes of illustration, the reactions will be indicated for monostyrene as the reactive monomer, for

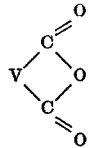

as the "unreactive" anhydride (where V indicates the remainder of a molecule of a suitable polycarboxylic acid anhydride having no olefinic unsaturation), and the half-ester

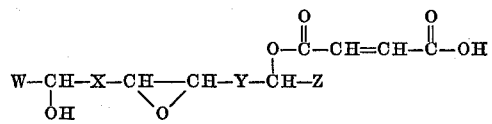

(where W, X, Y and Z designate other parts of a typical epoxy half-ester molecule that are not relevant to this discussion except that they may also contain similar reactive hydroxyl and/or epoxy groups that react in the manner hereafter to be described).

The monostyrene (vinylbenzene) has the structural formula

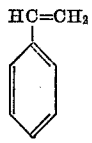

and is well known to have the property of reacting when heated in the presence of a suitable catalyst to form by addition-polymerization a polystyrene having the structure

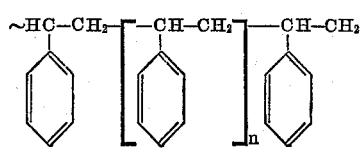

where $n$ is an integer whose value depends upon the reaction condition used. Other compounds with olefinic unsaturation (i.e., a double bond like that of the styrene) are capable of polymerizing with the styrene to form copolymers, and this happens with the half-ester

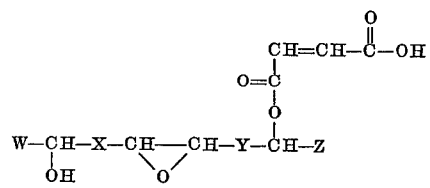

which opens its double bond to form a unit, hereinafter designated "E" and having the formula

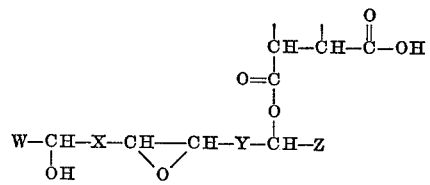

that will react with styrene and may be substituted for one or more of the above-indicated polystyrene units to illustrate the type of copolymer formed in the reaction between the styrene and the half-ester.

If these were the only reactions occurring, the final resinous product of the entire mixture could be illustrated as: —P—P—E—P—E—P—P—P—E— etc. where P indicates a polystyrene moiety and E indicates a half-ester moiety. At the same time, however, the anhydride

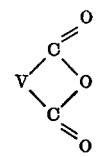

is reacting with the remaining hydroxyl and epoxy groups of the half-ester, to a full-ester stage, as indicated below, to cause cross-linking between epoxy units:

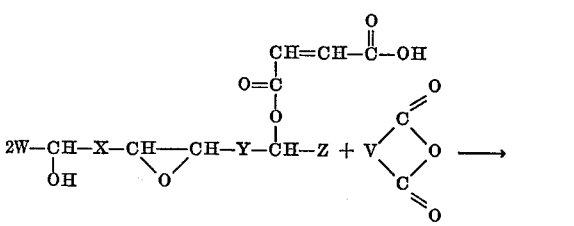

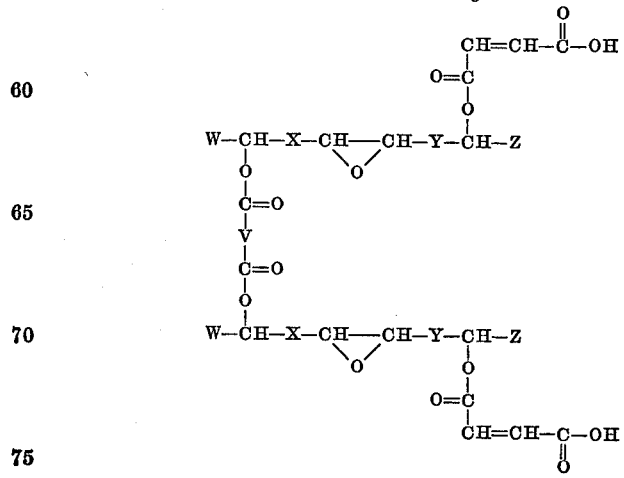

and/or

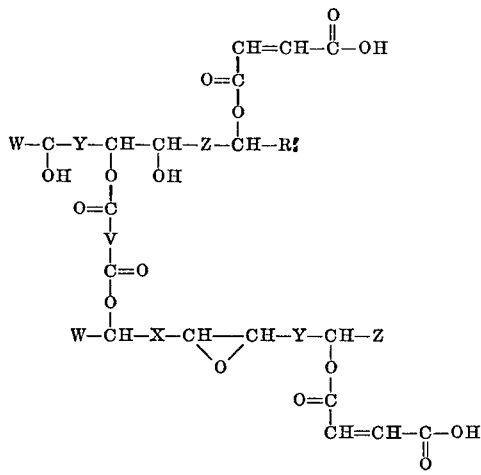

and/or to similar polymers with two epoxy groups cross-linked. The moieties W, X, Y and Z will usually contain other hydroxyl or epoxy groups that can react similarly with the anhydride to give further cross-linking.

There is, moreover, the known esterification cross-linking reaction between epoxy groups, catalyzed by the anhydrides, that is of the kind illustrated below in idealized form:

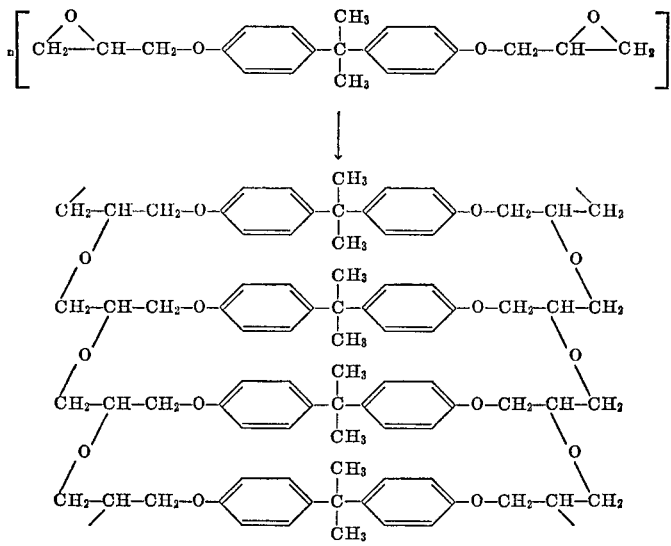

It should also become apparent that the basic concept the final curing of the admixture or blend are quite complex, comprising epoxy-resin molecules that are cross-linked by the anhydrides and by the opening and interaction of the epoxy groups. The ester moiety of the half-ester contributes to the cross-linking through the site of the olefinic unsaturation (which reacts with the styrene) and through the carboxyl group (which reacts with epoxy and hydroxyl groups).

From the following examples, it will be apparent to those skilled in the art that by the use of the concept that lies at the crux of the instant invention, valuable and unobvious improvements are made in epoxy-resin compositions, the manner of making and using them, and the properties of articles of various kinds treated with them, and that the practices described above are susceptible of many variations or modifications, all within the scope of the above-mentioned concept and its attendant advantages and benefits.

It should also become apparent that the basic concept of the invention is that it is possible to improve resin compositions of the kind that contain an epoxy resin, an olefinically unsaturated anhydride, curing agent, and a monomer that may be copolymerized with the olefinically unsaturated anhydride curing agent by proceeding in such fashion that the epoxy resin and certain critical amounts of the unsaturated anhydride are first reacted substantially only to the half-ester stage in the absence of any esterification catalyst. There is then added to the reaction mixture thus produced a substantial amount of one or more different, preferably liquid, anhydrides that contain no ethylenic unsaturation and are therefore not reactable with the polymerizable monomer, together with a suitable quantity of the polymerizable monomer and the required catalyst for the addition-polymerization reaction. In this way there are obtained resin compositions that have good low initial viscosity, are catalyzed, have pot lives considerably longer than other epoxy resin compositions of the kind that contain a tertiary amine or other esterification catalyst, can be quickly gelled and cured at reasonable times and temperatures, yet exhibiting other desirable properties such as low dissipation factor at elevated temperature, a property that cannot be obtained with $BF_3$ cured epoxies.

In the following Examples I to XII, there is used a mixture of epoxidized novolac resin and an epoxy resin produced by the reaction of bis (4-hydroxyphenyl) dimethylmethane with epichlorohydrin; it will be apparent that the invention can be practiced with other solid or liquid epoxy resins, such as cycloaliphatic-based epoxies, various diepoxide resins, glycidyl polyethers, halogenated epoxy resins and the like. The epoxy resin or resins used will generally have an epoxide equivalent of about 75 to 2500 (preferably 280 to 700), an average molecular weight of 140 to 3000 (preferably 300 to 1100), and a melting point under 135° C. (preferably under 85° C.).

In the examples, maleic anhydride is employed as the olefinically unsaturated dicarboxylic acid anhydride capable of reaction with the addition-polymerizable monomer, and it is preferred because of its low cost. Other olefinically unsaturated dicarboxylic anhydrides may be substituted for the maleic anhydride in whole or in part, such as citraconic anhydride, itaconic anhydride, chloromaleic anhydride, and the like, these anhydrides being used singly or in mixtures of two or more.

After the epoxy resin or resins and the "reactive" olefinically unsaturated dicarboxylic acid anhydrides mentioned have been reacted substantially to the half-ester stage, there are added, in accordance with the invention, one or more polycarboxylic acid anhydrides that contain no olefinic unsaturation and are not reactive with styrene or other addition-polymerizable monomers. These "unreactive" anhydrides are preferably liquid and are used in an amount of within 20% of the equivalent amount required for reaction with the unreacted hydroxyl and epoxy groups present in the half-ester mixture. The examples disclose the use of NMA (NADIC methyl anhydride) or a eutectic mixture of tetrahydrophthalic anhydride and hexahydrophthalic anhydride, but other similar "unreactive" anhydrides may be used as well such as dodecenyl succinic anhydride, trimellitic anhydride, methyl tetrahydrophthalic anhydride, chlorendic anhydride, benzophenone tetracarbocyclic dianhydride, pyromellitic dianhydride, phthalic anhydride. These may be used singly or in combination. The substantial amount of "unreactive" anhydride that is added is usually limited to an amount capable of reacting with the other compounds present, as otherwise unreacted anhydride tends to volatilize in applications involving exposure to heat and the properties of the composition are impaired. It should be understood, of course, that the terms "reactive" and "unreactive" refer to the reactivity of the anhydrides with the unsaturated monomer.

In the examples, monostyrene is used as the addition-polymerizable monomer, and it is preferred because of its low cost. There may also be used and substituted in the examples, however, such other liquid reactive monoethylenically unsaturated monomers which are free of functional groups reactive with the oxirane on the epoxy resin such as vinyl toluene, alphamethyl styrene, 2,4-dichlorostyrene, paramethyl styrene, vinyl acetate, methyl methacrylate, ethyl acrylate, methyl vinyl ketone and butyl methacrylate, as well as mixtures of any two or more of these monomers.

The amount used of such monomer may be varied within rather wide limits, ranging on a weight basis from about 5 parts to about 300 parts of monomers but preferably about 50 to 200 parts of monomer per 100 parts of epoxy resin. Increasing the proportion of vinyl monomer used tends to decrease the viscosity of the epoxy-resin composition. Dilution with such addition-polymerizable monomer may, however, be carried to the point where the desirable properties sought to be obtained by the use of an epoxy-resin-containing composition are substantially impaired or lost. On the other hand, the use of at least an amount of such monomer effective to impart a short gel time to the composition is required in accordance with the concept of the instant invention.

In the examples, t-butyl perbenzoate and/or benzoyl peroxide are used as a free-radical-type catalyst for the polymerization reaction. Among other catalysts of this type are the following: lauroyl peroxide, methyl ethyl ketone peroxide, t-butyl hydroperoxide, ascaridole, di-t-butyl diperphthalate, ozonides, 2,5 - dimethylhexane-2,5-diperoxybenzoate and the like. On the basis of present knowledge, the diperoxybenzoate is preferred for obtaining long pot life, but even with the others, pot lives are obtained that are substantially in excess of the longest heretofore observed in a system containing epoxy, styrene, and a reactive olefinically unsaturated anhydride. In similar prior systems, it has almost invariably been the practive to mix the ingredients with an esterification catalyst, with the result that the catalyzed pot life would be on the order of several minutes to a few hours, and at the most, a few days. Even if an esterification catalyst is not used, pot life is relatively short since maleic anhydride is much more reactive with styrene than the half-ester that is instead present in the compositions of this invention. The catalyst in the present invention is a free-radical-type catalyst for vinyl polymerization and is used in an amount of about 0.1% to about 2% by weight of the total resinous composition, although somewhat larger or smaller amounts may be employed if desired.

The resinous compositions of this invention may be mixed with suitable solid fillers such as hydrated alumina, silica, titanium dioxide, wollostonite, glass fibers, mica, graphite, calcium silicate, and the like. These fillers preferably are used in finely divided form and may be used singly or in combinations of two or more.

It may be possible in certain circumstances to use compositions that do not contain an inhibitor to prevent addition-polymerization of the styrene or similar monomer. As a practical matter, however, such inhibitors will almost invariably be present in such monomers supplied in commercial quantities. In the case of styrene, long pot life such as two months or more would not be obtained in an epoxy-anhydride-styrene system unless the inhibitor were present. Hydroquinone is usually used, but others are known to those skilled in the art, among which may be mentioned catechol, derivatives of catechol, quinhydrone, mono - t - butyl - hydroquinone and di-t-butyl-hydroquinone. Up to about 0.04% by weight can be used in accordance with prior principles of the art. If amounts too small are used, there is little effect, and if amounts too large are used, the styrene becomes difficult or impossible to polymerize. From the standpoint of obtaining long catalyzed pot life, use of mono-t-butyl-hydroquinone is preferred.

In the light of the examples hereinbelow, there will be obvious to those skilled in the art the manner of using an epoxy-resin composition in accordance with the instant invention to produce a desired article, such as a potted or encapsulated electrical or electronic component; a laminated article based upon a material sufficiently heat-resistant to withstand the curing operation, such as polyethylene glycol terephthalate in the form of fibrous sheets, matted, woven or the like, as well as woven glass fiber, paper, cloth asbestos or the like; or a casting. In most instances, if desirable properties are not obtained upon the initial curing operation, satisfactory or excellent properties are obtained after a further and prolonged baking at about 120° C. to 300° C. for about 4 to 30 hours.

The flow sheet, FIG. 1, is illustrative of a preferred practice of preparing a resinous composition in accordance with the invention.

FIG. 2 shows a coil 2, which has leads 4, potted in an insulating casing 6, the casing being a resinous composition in accordance with the invention and is thus illustrative of certain articles of the invention, namely, electrical or electronic components potted or encapsulated in the epoxy-resin compositions of the invention.

FIG. 3 shows a laminate 8 made of individual plies 10 of resin impregnated and/or resin coated woven glass cloth, that is bound into a unitary structure by the resin layer 12 of cured epoxy resin in accordance with the invention, and is thus illustrative of the laminated articles of the invention.

The invention will now be described with particular reference to the preparation and impregnation of coils suitable for use in high-voltage generators. Referring to FIG. 4 of the drawings, there is illustrated a coil 13, comprising a plurality of turns of conductors 14. Each turn of the conductor 14 consists essentially of a copper bar or wire wrapped with turn insulation 15. The turn insulation 15 preferably is prepared from a fibrous sheet or strip impregnated with a bonding resinous insulation. While the bonding resinous insulation may consist solely of a coating or uncured varnish or resin, it is preferred that it comprise a wrapping of fibrous material treated with a bonding resin. Glass fiber cloth, paper asbestos cloth or asbestos paper treated with a resin, however, may be used with equally satisfactory results. The resin applied to the turn insulation to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage generator. Therefore, ground insulation for the coil is provided by wrapping one or more layers of composite mica tape 16 about the turns 14. Such composite tape 16 comprises a pliable backing sheet 18 of polyethylene glycol terephthalate mat having a layer of mica flakes 20 bonded thereto by a liquid resinous binder.

The tape may be applied half lapped, butted or otherwise. Generally, a plurality of layers of the composite tape 16 are wrapped about the coil, with sixteen or more layers generally being used for high voltage coils. To impart better abrasion resistance and to secure a tighter insulation a wrapping of a tape 21 of a tough fibrous material, for example, glass fiber, asbestos or the like is applied to the coil.

In FIG. 5 of the drawings, there is a schematic illustration of the process steps which may be followed in preparing an insulated high voltage generator coil in accordance with this invention. The first step 22 comprises the building and wrapping of a coil as described above. The coil so prepared then is introduced into a vacuum impregnating tank 24 and subjected to a heat drying and evacuating operation to remove substantially all moisture, air and other undesirable volatile material from the coil. The polymerizable resinous composition of this invention is then introduced into the tank until the coil is completely submerged in the composition.

While the coil is completely covered with the polymerizable resinous composition, atmospheric air or a gas such as nitrogen or carbon dioxide is introduced into the impregnating tank under presure to assist the polymerizable composition in penetrating completely into the interstices of the coil 13 and to assure substantially complete filling thereof. The impregnating treatment need not be of long duration. Ten minutes under pressure ordinarily is sufficient to completely impregnate and saturate small windings. Longer impregnation periods, however, for example up to several hours or more, insure the most complete penetration and saturation of larger coils and windings. It will be understood that while vacuum impregnation produces the best results, ordinary immersions under atmospheric conditions will give good results.

The impregnated but uncured coil then is withdrawn from the impregnating tank, drained briefly and subjected to a curing operation 26. In some cases the coil is wrapped with an impervious tape to prevent escape or loss of the liquid composition therefrom during the curing operation. One preferred method of curing the polymerizable resinous composition comprises placing the impregnated coil in a sizing and curing press provided with heating elements such as hot water pipes, electric heating members or the like. The polymerizable resinous composition may be cured on the coil while the same is in the mold by subjecting the same to heat to polymerize and cure the resin to a hard, insoluble and infusible solid. In other cases the wrapped coils can be put into an oven and cured by heating to temperatures above 80° C., for example, up to about 135° C.

The following are specific examples of the practice of the invention described above. Reference to parts or percentages means parts by weight or weight percent, unless a different meaning is specifically indicated.

EXAMPLE I

There were mixed 75 parts of a bisphenol A-epihalohydrin epoxy resin (such as that sold by Dow Chemical Co. and identified as resin DER 661) having an epoxide equivalent weight of 475–575 and a Durran's softening point of 70° C.–80° C., and 75 parts of en epoxidized novolac resin prepared by reacting phenol, formaldehyde and epihalohydrin, the novolac having an epoxide equivalent weight of 175–182 and a viscosity at 25° C. to 19,000,000 centipoises, such as that sold by Dow Chemical as DEN 438. The mixture was heated to 90° C., and 7.5 parts of maleic anhydric were added. No esterification catalyst was present. The mixture was maintained for 55 minutes at 85–90° C., to effect a reaction to the half-ester stage between the maleic anhydride and the epoxy and hydroxyl groups of the epoxy-resin mixture. Then, 75 parts of NMA, viscous liquid methylbicyclo [2.2.1] heptene-2,3-dicarboxylic anhydride isomers (commercially available as NADIC methyl anhydride and also known and described as the maleic anhydride adduct of methylcyclopentadiene) were added. The mixture was permitted to cool to 60° C., no appreciable change in viscosity being observed. There was then added 120 parts of styrene containing an inhibitor 0.003% of hydroquinone based on the total weight of resin. The mixture was permitted to cool to room temperature, and 0.3% each of t-butyl perbenzoate and benzoyl peroxide were added to the mixture. The resulting composition mixture was a clear solution having a No. 10 Demmler cup viscosity of 3.6 seconds.

Fifteen parts of the mixture produced in the manner indicated above were placed in an aluminum cup and baked in an oven at 135° C., a clear, soft gel being formed in seven minutes. After being baked overnight, the above mixture was rigid but clear and tough at room temperature. The remainder of the epoxy-resin solution was kept at room temperature, and it was observed that it became gelled only after six days. Typical conventional polyester resins catalyzed with benzoyl peroxide usually gel in one to two days or less at room temperature.

EXAMPLE II

Example I was repeated, except that the resin composition was catalyzed by using 0.6% of t-butyl perbenzoate and with no benzoyl peroxide. The gel time was nine minutes at 135° C. The catalyzed resin remained fluid after being kept for two months at room temperature.

EXAMPLE III

There were mixed 375 parts of resin DER 661 and 375 parts of DEN 438. The mixture was heated to 95° C., and there were added 37.5 parts of maleic anhydride. The temperature was maintained at about 90° C. for one hour, at the end of which time it was determined by infrared analysis that the half-ester formation reaction had gone 70 percent to completion. To 916 parts of the reaction product there were added 435 parts of NMA, 700 parts styrene, 0.003% (based on total weight) of hydroquinone, and 0.3% each of t-butyl perbenzoate and benzoyl peroxide. The resin composition was essentially the same as above in Example I except that a large amount was prepared.

The resin composition thus produced was tested to determine electrical properties, thermal stability, polymerization shrinkage, and applicability as an impregnate or encapsulant for a pulse transformer, as follows:

The epoxy-resin composition of the Example III was gelled in the form of a casting ⅛ inch thick by being heated to 135° C. for nine minutes, and then baked overnight at that temperature. The casting exhibited the following electrical properties measured at 60 cycles: a dielectric constant at 150° C. of 3.6% and at 175° C. for 3.9%, and a power factor at 150° C. of 3.7%, and at 175° C. of 14.0%.

To test for thermal stability, separate cast pieces of the resin composition ⅛ x ¾ x 1½ inches were aged in ovens maintained at different temperatures, exhibiting after 186 hours the following weight losses, in percent: at 175° C., 0.57; at 200° C., 1.74; at 225° C., 3.16; and at 250° C., 6.65. These are excellent, low weight losses.

To test for polymerization shrinkage, powdered beryl was added to the resin composition to give a mixture that was 73.5% beryl and 26.5% resin. This mixture was cast into an aluminum tube 57.0 millimeters in internal diameter. A spray of a polytetrafluoroethylene suspension was used as a mold lubricant. The resin was gelled at 80° C. and then baked overnight at 135° C. The resulting casting had an outside diameter of 56.4 millimeters, only 0.6 millimeter less than the I.D. of the mold. In a similar experiment, using only one-half as much maleic anhydride and the other conditions being the same as in Example III, a casting having an outside diameter of 56.6 millimeters was obtained. Thus, the obtained shrinkage values are comparable to those observed in anhydride-hardened epoxy resins not modified with the addition of styrene, and are much lower than those observed with typical polyester resins.

To test the applicability of the product as a pulse-transformer impregnant or encapsulant following the procedure of U.S. Pat. 2,785,383, 33 parts of minus 325 mesh powdered mica were mixed with 67 parts of the resin, forming a viscous composition. A 3 x 3 x 3½ inch coil assembled on a 3¾ inch long wound magnetic core was dipped into the resin to a point just below the top of the coil, leaving the top surface open. The resin coated the outer surfaces to form a capsule of resin-mica thereon. The coil was inverted and placed in an oven at 135° C. The resin quickly gelled without excessive run-off to form an outer capsule. The coil was then inverted to bring the open surface to the top and it was impregnated with the low-viscosity unfilled resin which was retained by the resin capsule, and again baked at 135° C. Finally, the entire coil and core assembly was immersed in the mica filled resin so as to cover the exposed top surface, and again baked at 135° C. to gel and cure the resin. The entire outer surface of the transformer was evenly coated with a heavy layer of the resin mica encapsulant. Excellent transformers are produced thereby. The encapsulating procedure of Pat. 2,795,009 can be practiced using these resin compositions to produce excellent encapsulated transformers.

EXAMPLE IV

There were mixed 500 parts of resin DER 661, 500 parts of resin DEN 438 and 50 parts of maleic anhydride, the above mixture being heated at 90° C. for one hour to produce the maleic half ester. To 950 parts of the reaction mixture there were added 392 parts of a eutectic anhydride solution composed of 90 percent hexahydrophthalic anhydride and 10 percent tetrahydrophthalic anhydride. There were also added 724 parts of styrene monomer containing 0.003% hydroquinone (based on the total weight of resin). The resin solution thus produced has a viscosity of 25° C. of 125 centipoises. A portion of the resin solution was catalyzed by the addition of 0.5% of t-butyl perbenzoate and gelled by being heated in an oven at 135° C. for ten minutes. After being baked overnight at 135° C., the solid resin body thus produced was clear and tough. When tested at 175° C. and 60 cycles, the dielectric constant was 3.8% and the power factor was 2.5%.

EXAMPLE V

There were mixed 7.5 parts of resin DEN 438, 2.5 parts of resin DER 661, and 0.5 part of maleic anhydride. The mixture was heated for one hour at 90° C. to produce the maleic half ester. Then, 6.0 parts of NMA were added to the hot resin mixture. After cooling thereof to room temperature, there were added two parts of styrene, 0.003% of hydroquinone, and 0.6% of t-butyl perbenzoate. After thorough mixing, this composition was used to make a woven-glass laminate. Twelve plies of No. 181 satin-weave glass cloth, A1100 finish, were dipped into the composition. They were then laminated by being pressed together at 25 p.s.i. and heated at 135° C. for 15 to 20 minutes. The laminate was then after-baked for 4 hours at 175° C. It contained 30 percent of resin and 70 percent glass. It was cut into one-inch test specimens across the weave of the glass. The test specimens exhibited a room-temperature flexural strength of 60,000 p.s.i. The flexural strength at 150° C. was 21,000 p.s.i. Certain samples were further baked at 250° C. for 15 hours and again tested for flexural strength at 150° C., a value of 44,500 p.s.i. being observed.

EXAMPLE VI

There were mixed 2.5 parts of resin DER 661, 0.5 part of maleic anhydride, and 7.5 parts of the reaction product of epichlorohydrin with an aliphatic polyether such as polypropylene glycol, having an epoxide equivalent of 300 to 335 (a resin of this type being available from Jones-Dabney Company as "Epi-Rez 502"). The above mixture was heated for two hours at 90° C. There were then added 6.10 parts of dodecenyl succinic anhydride and 0.5 part of styrene, together with 0.003% of hydroquinone and 0.5% of t-butyl perbenzoate. There was thus obtained a flexible resin composition, having in the cured condition good resistance to cracking engendered by thermal cycling. The resin composition had a Gardner-Holt viscosity at 25° C. of P. A 15-gram sample was gelled by being heated for about 35 minutes at 135° C. After being baked overnight, the sample exhibited a Durometer hardness of 25D. Two Olyphant steel washers ⅛ inch in diameter were cast in the uncured composition, which was then gelled and cured by being baked overnight at 135° C. The specimens thus produced were twice cooled to —30° C. and permitted to return to room temperature, and no cracking was observed.

EXAMPLE VII

There were mixed 2.5 parts of resin DER 661, 0.5 part of maleic anhydride, and 7.5 parts of an epoxy resin modified with epoxidized trimer acid to provide flexible compositions after curing and having an epoxide equivalent weight of 400–450, such as the epoxy resin sold by the Jones-Dabney Company as "Epi-Rez 5132." The above mixture was heated for two hours at 90° C. Then, 4.68 parts of dodecenyl succinic anhydride were added to the hot resin. The resin was permitted to cool to room temperature and then 5.5 parts of styrene, 0.03% hydroquinone, and 0.5% t-butyl perbenzoate were added, and the solution thoroughly mixed. At 25° C., the mixture had a Gardner-Holt viscosity of P. When gelled and baked overnight at 135° C., the mixture gave a clear, tough resin with a Durometer hardness of 80 D.

Fifty parts of the above resin solution were blended with 50 parts of the resin solution produced in Example VI. A 15 gram sample thereof was gelled and baked overnight at 135° C., and then tested for hardness, exhibiting a Durometer hardness of 35 D.

In another test, the resin solution of this example was mixed with 98 parts per 100 parts of resin of very finely divided silica to give a thioxotropic mixture. A metal strip was dipped into the mixture, removed slowly, and baked overnight at 125° C. A tough, flexible coating about 50 mils in thickness was formed.

EXAMPLE VIII

There were mixed 3.75 parts of resin DER 661, 6.25 parts of resin DEN 438, and 0.375 part of maleic anhydride, the mixture being heated to 90° C. for six hours to produce reaction to the half-ester stage. There were then added to the hot mixture 5.5 parts of NMA, and after cooling to room temperature, 8 parts of styrene, 0.003% of hydroquinone, and 0.2% of 2,5-dimethylhexane-2,5-diperoxybenzoate. In this manner, there was made a resin solution that will hereinafter be designated "F–733–8."

EXAMPLE IX

Example VIII was repeated, except that 16 parts of styrene were added, rather than 8, and there was produced a resin solution that will hereinafter be designated "F–733–16."

The following data was available for comparison of the properties of the two above-mentioned formulations F–733–16 and F–733–8, with a Resin X which latter is a diglycidyl ether of bisphenol-A epoxy-resin formulation containing a diglycidyl ether of 1,4-butanediol, now widely used as insulation in low-voltage applications, i.e., in applications not involving more than 7200 volts.

As respects gel time of 20-gram samples, the formulation F–733–8 are gelled in 1½ to 2 hours at 100° C. or in 20 minutes at 125° C. Resin X required six hours at 100° C. or 70 minutes at 125° C.

As respects viscosity, formulation F–733–8, when tested at room temperature, increased from an initial value of 142 centipoises to a value of 175 centipoises after 70 days. For comparison, a general-purpose polyester resin is usually made with an initial viscosity of 2200 centipoises. In a test of composition F–733–16, there was no measurable increase in viscosity after seven months of storage at 0° C.

As respects thermal stability, 15-gram samples of F–733–8 and Resin X were aged at 175° C. for one month. The F–733–8 had a weight loss of 0.37%, and the Resin X exhibited a weight loss after one month of 2.89%.

Samples of F–733–8 and Resin X were tested for chemical resistance to various media in accordance with our procedure ASTM D453–60T. The results are presented in the following table.

TABLE I.—PERCENT WEIGHT GAIN AND CHANGE IN THICKNESS AFTER SEVEN-DAY IMMERSION

|  | F–733–8 | | Resin X | |
| --- | --- | --- | --- | --- |
|  | Weight | Thickness | Weight | Thickness |
| Acetone at room temperature | 8.09 | 9.06 | Disintegrated | |
| Benzene | 0.82 | 0.21 | Disintegrated | |
| Glacial acetic acid at 50° C | 4.09 | 3.05 | 60.00 | |
| Sodium hydroxide 10% solution at 50° C | 0.56 | 0.69 | 2.14 | 3.50 |
| Sulphuric Acid 30% solution at 50° C | 0.50 | 0.56 | 1.08 | 1.30 |
| Nitric Acid 40% solution at 50° C | 6.72 | 1.02 | Disintegrated | |

The electrical properties of composition F–733–16 were determined, the results being presented in the following table.

TABLE II.—ELECTRICAL PROPERTIES OF F–733–16 (60 CYCLE MEASUREMENTS)

|  | Dielectric constant | Dissipation factor |
| --- | --- | --- |
| Temperature, ° C.: | | |
| 25 | 3.1 | 0.0024 |
| 100 | 3.2 | 0.0023 |
| 125 | 3.2 | 0.012 |
| 150 | 3.4 | 0.055 |
| 175 | 3.6 | 0.068 |

Further baking will reduce the dissipation factor. With sufficient cure a dissipation factor of 0.03 at 200° C. has been obtained.

EXAMPLE X

High-voltage test bars 0.5 x 2 x 11½ inches insulated with mica tape and glass tape were vacuum impregnated with the two above-mentioned compositions F–733–8 and Resin X. The bars impregnated with F–733–8 had nine half-lapped layers of 0.006 x 1.56 mica tape and a half-lapped layer of 0.004 x 1.5 inch glass tape. The bars impregnated with Resin X had an additional butted layer of mica tape. In all, eight bars were prepared: Two with F–733–8, two with F–733–8 plus about 3% of trimethoxyvinylsilane, two with Resin X at room temperature, and two with the same resin heated to 80° C. to lower its viscosity. The last-mentioned two bars were subjected to a pressure of 50 p.s.i. for one hour after vacuum impregnation. All bars were pressed between angle irons after impregnation. The bars impregnated with F–733–8 were baked overnight at 135° C., and the bars impregnated with Resin X were baked 16 hours at 80° C. and then 16 hours at 135° C. The ends of all bars were insulated by a thick casting of epoxy resin. The bars were then immersed in tap water to within one-half inch of the top of each, and after four days at room temperature and then 37 days at 65° C., the bars were removed from water and tested for electrical properties. The results were presented in the following table:

TABLE III.—ELECTRICAL PROPERTIES AFTER PROLONGED IMMERSION IN WATER [1]

| Resin | Percent power factor | Megohms |
| --- | --- | --- |
| X | 6.4 | 170 |
| X | 22.4 | 26 |
| X [2] | 6.9 | 160 |
| X [2] | 38.0 | 19 |
| 733–8 | 3.3 | 310 |
| 733–8 | 4.5 | 300 |
| 733–8 [3] | 3.9 | 280 |
| 733–8 [3] | 4.6 | 280 |

[1] Measurements at 60 cycles per second, 50-volt bridge.
[2] Bars impregnated with resin preheated to 80° C. and 50 p.s.i. pressure.
[3] Bars impregnated with resin containing 3% silane.

The above results show superior retained insulating ability after prolonged water immersion for articles coated with the epoxy-resin compositions in accordance with the instant invention, in comparison with other epoxy-resin compositions.

EXAMPLE XI

High voltage test bars were prepared, as described above, except that all bars were vacuum-impregnated and then baked in a horizontal position overnight in a 135° C. air blast oven, and the Resin X was heated to 80° C. before impregnation to lower its viscosity. The bars were not taped with Mylar, and press-plates were not used, since this test was designed to simulate the end windings of an impregnated motor stator. The test bars were examined to determine weight gain and amount of drainage or run-off. The results were as presented in the following table:

TABLE IV

| Resin | Weight gain, grams | Drainage, grams |
| --- | --- | --- |
| X | 47 | 13 |
| F–733–8 | 55 | 0 |

EXAMPLE XII

High-voltage test bars were prepared as described above, except that the bars were 35 inches long, the resin used was the above-mentioned composition F–733–16, one of the bars contained no tape bond, and the epoxy-resin composition was cured by being baked overnight at 135° C. The test bar without a tape bond was tested for electrical properties. It held 60 kilovolts, and in a test in which the impressed voltage was increased one kilovolt per minute, step-wise, it failed at 65 kv. It was further tested to determine percent power factor at room temperature and at 125° C. with various lower impressed voltages, the results being as presented in the following table:

TABLE V.—PERCENT POWER FACTOR AT DIFFERENT TEMPERATURES AND IMPRESSED VOLTAGES OF TEST BAR IMPREGNATED WITH COMPOSITION F–733–16

|  | Room temperature | 125° C. |
| --- | --- | --- |
| Voltage, kilovolts: | | |
| 4 | 0.95 | 2.44 |
| 11.5 | 1.83 | 2.55 |
| 23 | 2.51 | 3.01 |

A second bar was made, having a 5%, by weight, epoxy resin binder in the mica tape, and similarly impregnated with epoxy-resin composition F–733–16 and cured by being baked overnight at 135° C. This bar was tested for percent power factor at different impressed voltages and temperatures, both as first made and after an additional baking at 150° C. for 24 hours, the results being as presented in the following table:

TABLE VI.—PERCENT POWER FACTOR AT DIFFERENT TEMPERATURES AND IMPRESSED VOLTAGES OF TEST BAR IMPREGNATED WITH COMPOSITION F-733-16

| Voltage, kilovolts: | Room temperature | 125° C. |
|---|---|---|
| 4 | 1.21 | 6.27 |
| 11.5 | 1.35 | 6.49 |
| 23 | 1.65 | 7.23 |
| 4 [1] | 1.03 | 4.32 |
| 11.5 [1] | 1.06 | 4.42 |
| 23 [1] | 1.31 | 4.75 |

[1] Test bar baked at 160° for 24 hours.

The values presented above are somewhat superior to those obtained with the polyester-impregnated high-voltage bars named prior to the instant invention.

The following examples demonstrate the effect of using different quantities of maleic anhydride and epoxy resin.

EXAMPLE XIII

There were mixed five parts of a liquid epoxy resin prepared by reacting bis(4 - hydroxyphenyl)dimethylmethane and epihalohydrin and having an epoxide equivalent weight of 175–210, such as the epoxy resin sold by Shell Chemical Company as Epon 828, five parts of resin DER 661, and 0.1 part of maleic acid anhydride, and the mixture was cooked for six hours at 90° C. To the cooked mixture there were then added 5.27 parts of NMA, eight parts of styrene, 0.009% based upon the total weight of t-butyl hydroquinone, and 0.2% of 2,5-dimethylhexane-2,5-diperoxybenzoate. This produced a resin composition hereinafter designated A, certain properties of which are given below.

EXAMPLE XIV

Example XIII was repeated, except that there were used 0.25 part of maleic anthydride and 5.00 parts of NMA. This produced a resin composition hereinafter designated B, certain properties of which are given below.

EXAMPLE XV

Example XIII was repeated, except that there were used 1.0 parts of maleic anhydride and 3.63 parts of NMA, and the cooking time was three hours. This produced a resin composition hereinafter designated C, certain properties of which are given below.

EXAMPLE XVI

Example XIII was repeated, except that there were used 2.0 parts of maleic anhydride and 1.82 parts of NMA, and the cooking time was two hours. This produced a resin composition hereinafter designated D, certain properties of which are given below.

EXAMPLE XVII

Example XIII was repeated, except that there were used 3.0 parts of maleic anhydride and no NMA, the cooking time was two hours, and 0.018% of t-butyl hydroquinone was used instead of 0.009%. This produced a resin composition hereinafter designated E, certain properties of which are given below.

TABLE VII.—PROPERTIES OF RESIN COMPOSITIONS CONTAINING DIFFERENT AMOUNTS OF MALEIC ANHYDRIDE AND NMA

| Resin comp. | Gel time of 15-gram cup sample, min. | Shelf life, days | Viscosity, #4 Zahn Cup, seconds |
|---|---|---|---|
| A | 152 | (¹) | 10.5 |
| B | 32 | (¹) | 12 |
| C | 18 | 13 | 30 |
| D | 8.5 | 3 | 15 |
| E | 12 | 3 | 15 |

[1] Not determined.

From the foregoing data, it will be seen that with the particular resin system employed, there should be used a maximum of 1.0 part of maleic anhydride per 10 parts of epoxy resin, the shelf life becoming undesirably short if more is used, and preferably more than 0.1 part of maleic anhydride per 10 parts of epoxy resin, the gel time becoming undesirably long if less is used. When different epoxy resins are used, the optimal amount of maleic anhydride or the like to use may vary somewhat, but it will be apparent to those skilled in the art that in each case the amount of "reactive" anhydride can be adjusted to obtain an optimal combination of gel-time and pot-life properties for the particular use for which the composition is intended.

EXAMPLE XVIII

An epoxy-resin composition in accordance with the invention was made and used to impregnate a high-voltage generator coil as hereinabove described with reference to FIG. 4. The uncured epoxy-resin composition was made by mixing 6.25 parts of resin DEN 438, 3.75 parts of resin DER 661, and 0.25 part of maleic anhydride, heating these in the absence of esterification catalyst for six hours at 90° C. to effect a reaction to the half-ester stage, and then adding to the material so obtained six parts of NMA, 19 parts of monostyrene, and 0.07 part of 2,5-dimethylhexane-2,5-diperoxybenzoate. As described above, a coil was built of copper conductors having turn insulation, wrapped with a plurality of layers of composite mica tape, further wrapped with glass fiber tape, and then vacuum-impregnated with the above-mentioned uncured epoxy-resin composition. The impregnated coil was heated in a press for about six hours at 135 to 150° C. to cure the resin and then baked further at 135 to 150° C. overnight. An impregnated and encapsulated high-voltage-generator coil of excellent properties was thereby produced.

EXAMPLE XIX

An epoxy-resin composition in accordance with the invention was made and used to impregnate a low-voltage motor coil. The uncured epoxy-resin composition was made by mixing 6.75 parts of resin DEN 438, 3.25 parts of resin DER 661, and 0.25 part of maleic anhydride, heating this mixture in the absence of esterification catalyst for six hours at 90° C. to effect a reaction to the half-ester stage, and then adding to the material so obtained six parts of NMA, eight parts of monostyrene, and 0.05 part of 2,5 - dimethylhexane-2,5-diperoxybenzoate. A coil was built as described above with reference to FIG. 4. The chief difference between the high-voltage coil described above and the present low-voltage coil is in the use with the latter of a smaller number of wraps of composite mica tape, say, eight instead of sixteen. The coil was then vacuum-impregnated with the uncured epoxy-resin composition mentioned above, baked in a press for six hours at 135–150° C., and then baked overnight at 135–150° C. An insulated low-voltage motor coil of excellent properties was thereby produced.

EXAMPLE XX

A modified epoxy-resin composition in accordance with the invention was used to cement the field coils to the poles and frame of a form-wound electric motor. To 75–80 parts of a powdered inorganic filler (minus 100 mesh) there were added 25–20 parts of the uncured epoxy-resin composition of Example VIII. This mixture was then applied to the poles and frame of a form-wound electric motor and used to cement the field coils of said motor to said poles and frame. The mixture was cured by baking at 135–150° C. for about eight hours. The modified composition in its cured state has high thermal conductivity, gives a good bond, and exhibits excellent thermal stability.

To further distinguish the "reactive" and "unreactive" anhydrides employed in the foregoing examples, it is necessary to consider not only the presence of the olefinic unsaturation but also the reactivity of the olefinic uncaturation. In maleic, itaconic and citraconic anhydride, the unsaturation is associated with a carbon that is adjacent to the electronegative carboxyl group. The unsaturation in these anhydrides is reactive in the presence of free-radical type catalysts. The dodecenyl-succinic anhydride happens to have olefinic unsaturation but this unsaturation is not "reactive" in the foregoing sense because the unsaturation is not associated with a carbon adjacent to the electronegative carboxyl group. The dodecenyl-succinic anhydride is not reactive in the presence of free-radical catalysts. An olefinic unsaturation, remote from the carboxyl group would have to be a conjugated unsaturation to be reactive in the presence of free-radical catalysts. This should explain the utility of the dodecenyl-succinic anhydride as an "unreactive" anhydride and not as a "reactive" anhydride. The other anhydrides mentioned hereinbefore are more easily classed on the presence or absence of olefinic unsaturation per se.

The Resin X, selected for comparative purposes hereinabove, is known as one of the best epoxy resin impregnating systems. The composition contains about 70 parts of a DGEBA epoxy having an average molecular weight of 350–400, about 30 parts of the diglycidyl ether of 1,4-butanediol catalyzed with two parts of $BF_2 \cdot 400$.

From the foregoing examples, it is apparent that articles so made have such advantages as one or more of: high-heat distortion temperature, low polymerization shrinkage, excellent thermal stability, low power factor, improved resistivity after humidification, and ability to withstand prolonged immersion in strong aqueous solutions of warm nitric acid. Because of such properties, electrical or electronic components coated with epoxy-resin compositions in accordance with the instant invention are particularly suitable for high-voltage application, i.e., for applications involving exposure to more than 7200 volts, bringing to such applications for the first time the advantages accruing from the use of an epoxy-resin-base composition (improved adhesiveness, etc.) as opposed to the use of the polyester-type resins heretofore used on articles intended for such applications.

I claim as my invention:

1. A method of making an insulated electrical component suitable for use in high-voltage applications, said method comprising applying to a mica wrapped electrical conductor in said component an epoxy-resin composition consisting essentially of:
   (a) the product of reaction substantially to the half ester stage in the absence of esterification catalyst of at least one epoxy resin having an epoxide equivalent of 75 to 2500 and a molecular weight of 140 to 3000 and at least one olefinically unsaturated reactive dicarboxylic acid anhydride in an amount of from 1 to 10 parts by weight for each 100 parts of epoxy resin,
   (b) a substantial amount of a polycarboxylic acid anhydride having no reactive olefinic unsaturation, said amount being sufficient to react with at least 80% of the equivalent amount required for reaction with the unreacted hydroxyl and epoxy groups present in the half ester stage,
   (c) a monoethylenically unsaturated monomer free of functional groups reactive with the oxirane on the epoxy resin, in an amount of from about 5 to 300 parts of each 100 parts by weight of epoxy resin reacted to form said product of reaction defined in subparagraph (a), and
   (d) a free-radical catalyst for addition polymerization in an amount of about 0.05 to 2 percent by weight of the total composition,
   and then heating said composition to a temperature of about 70° C. to 200° C. for a period of time to cure said composition to its solid state.

2. A method as defined in claim 1, characterized in that said epoxy-resin composition further contains a small but effective amount of an agent capable of inhibiting substantial addition polymerization of said monomer at room temperature but permitting addition polymerization at a moderately advanced temperature of the order of 100° C. to 200° C.

3. A method of making an insulated electrical conductor comprising the steps of (1) wrapping plural turns of a micaceous tape about the conductor, (2) impregnating the wrapped conductor with a fluid resinous composition of low viscosity and long room-temperature pot life consisting essentially of admixture of:
   (a) the product of reaction substantially to the half ester stage in the absence of esterification catalyst of at least one diglycidyl ether of bisphenol-A having an epoxide equivalent of 280 to 700 and a molecular weight of 300 to 1100 and from 2.5 to 5 parts by weight of maleic anhydride for each 100 parts of diglycidyl ether,
   (b) a polycarboxylic anhydride containing no olefinic unsaturation,
   (c) from about 50 to 200 parts by weight of styrene for each 100 parts of diglycidyl ether employed in (a) hereinabove, and
   (d) from about 0.05 to 2 percent, by weight of the total composition, of a catalyst selected from the group consisting of t-butyl perbenzoate and 2,5-dimethylhexane-2,5-diperoxybenzoate, and (3) heating the impregnated conductor to cure the resinous composition to its solid state.

4. The method of claim 3 wherein the micaceous tape contains a resinous binder.

5. The method of claim 4 wherein the resinous binder is an epoxy resin.

6. A method as defined in claim 1 wherein said epoxy-resin composition is further characterized in that said monomer is styrene, said anhydride having no olefinic unsaturation is selected from the group consisting of bicyclo [2.2.1] heptene-2,3-dicarboxylic anhydride monomers and mixtures of tetrahydrophthalic and hexahydrophthalic anhydrides, and said olefinically unsaturated reactive dicarboxylic acid anhydride is maleic anhydride.

7. The method of claim 3 wherein said anhydride having no olefinic unsaturation is selected from the group consisting of bicyclo [2.2.1] heptene-2,3-dicarboxylic anhydride monomers and mixtures of tetrahydrophthalic and hexahydrophthalic anhydrides.

References Cited
UNITED STATES PATENTS

| | | | |
|---|---|---|---|
| 3,009,889 | 11/1961 | Meyer et al. | 260—837 R |
| 3,099,638 | 7/1963 | Foster | 260—837 R |
| 3,271,509 | 9/1966 | Calderwood et al. | 156—330 X |
| 3,420,914 | 1/1969 | May | 156—330 X |

LELAND A. SEBASTIAN, Primary Examiner

E. A. MILLER, Assistant Examiner

U.S. Cl. X.R.

156—305, 330, 332